(12) United States Patent
Burkhard

(10) Patent No.: US 7,365,276 B2
(45) Date of Patent: Apr. 29, 2008

(54) FORCE-TRANSMITTING DEVICE

(75) Inventor: Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/749,189

(22) Filed: May 16, 2007

(65) Prior Publication Data

US 2007/0209452 A1    Sep. 13, 2007

Related U.S. Application Data

(63) Continuation of application No. 10/977,617, filed on Oct. 27, 2004, now Pat. No. 7,220,924.

(30) Foreign Application Priority Data

Nov. 6, 2003    (EP)  ................................. 03104106

(51) Int. Cl.
*G01G 7/00* (2006.01)
(52) U.S. Cl. .................. 177/229; 177/210 EM; 177/212; 73/862.634; 73/862.639
(58) Field of Classification Search ............... 177/229, 177/210 EM, 212; 73/862.634, 864.639
See application file for complete search history.

(56) References Cited

U.S. PATENT DOCUMENTS 4,125,168 A    11/1978 Ormond

| 4,655,306 A | 4/1987 | Saner |
| 5,205,369 A | 4/1993 | Neeleman |
| 5,250,762 A | 10/1993 | Gustafsson et al. |
| 5,866,854 A | 2/1999 | Emery et al. |
| 2005/0121237 A1 | 6/2005 | Kusumoto |

FOREIGN PATENT DOCUMENTS

| CH | 670704 A5 | 6/1989 |
| DE | 4305425 A1 | 8/1994 |
| DE | 19535202 C1 | 11/1996 |
| DE | 19859992 A1 | 6/2000 |
| EP | 0501351 A2 | 9/1992 |
| EP | 0511521 B1 | 5/1995 |
| EP | 1160555 A2 | 12/2001 |
| EP | 1347277 A1 | 9/2003 |

*Primary Examiner*—Randy W Gibson
(74) *Attorney, Agent, or Firm*—Standley Law Group LLP

(57) ABSTRACT

In a force-transmitting device of a force-measuring cell with a parallel-guiding mechanism in which a stationary parallelogram leg and a movably guided parallelogram leg are connected to each other by parallelogram guides, at least one of the parallelogram legs has a fastening part with at least two fastening portions. Each fastening portion has a fastening pad with a tapped hole normal to the fastening pad surface, for fastening the device to a housing or a load carrier. The parallelogram leg has slot-shaped incisions that serve to uncouple the fastening portions from the rest of the parallelogram leg, so as to prevent the propagation of assembly stresses from the fastening portions into the working parts of the force-measuring cell.

17 Claims, 4 Drawing Sheets

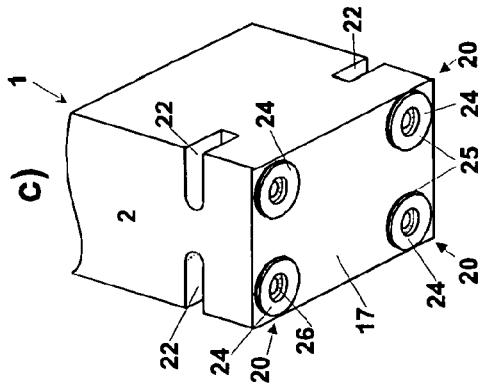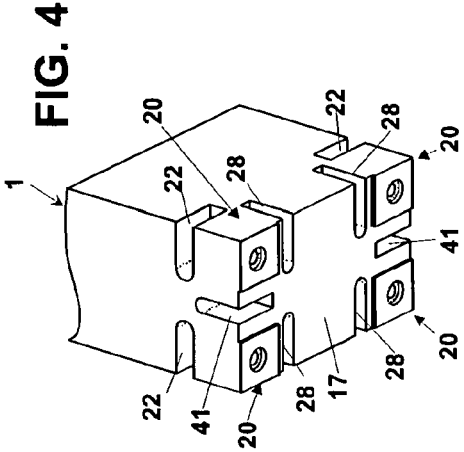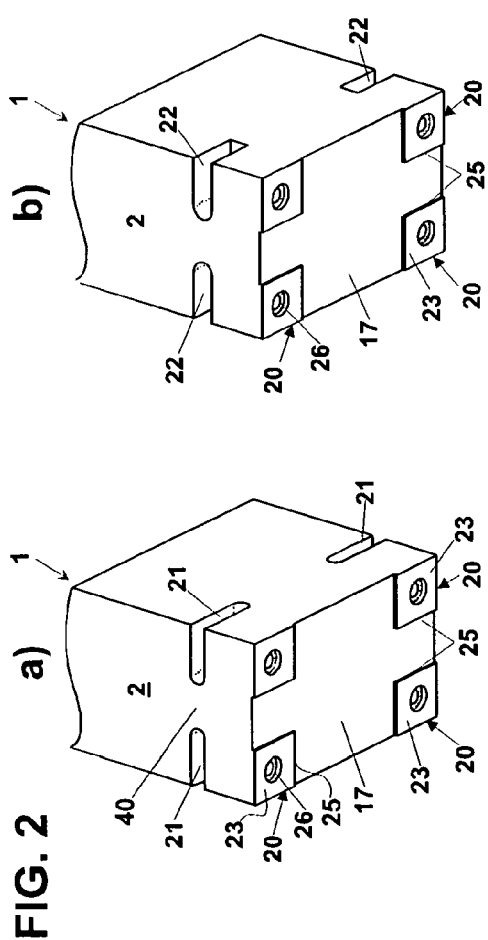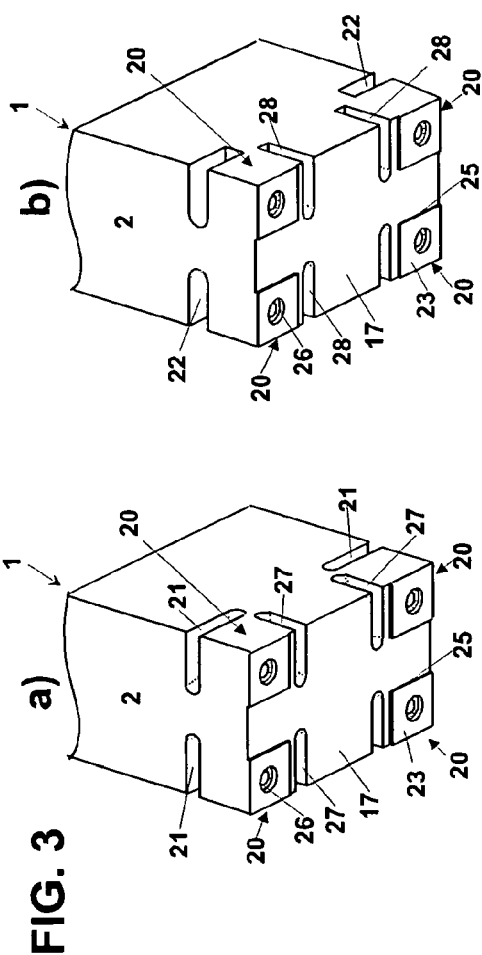
FIG. 2
FIG. 3
FIG. 4

FORCE-TRANSMITTING DEVICE

CROSS-REFERENCE TO RELATED APPLICATIONS

This application is a continuation of U.S. application Ser. No. 10/977,617, filed 27 Oct. 2004, now U.S. Pat. No. 7,220,924, which is incorporated by reference as if fully recited herein.

TECHNICAL FIELD

The invention relates to a device for transmitting a force in a force-measuring cell with a parallel-guiding mechanism wherein a fixed, stationary parallelogram leg and a movably guided parallelogram leg are connected to each other by parallelogram guides, wherein the stationary parallelogram leg and/or the movably guided parallelogram leg has a part which serves the function of fastening and has at least two fastening portions. Each of the fastening portions has at least one hole running perpendicular to one of the surfaces of the respective parallelogram leg. The holes serve to attach a load carrier to the force-transmitting device and/or to attach the force-transmitting device to a housing or to an intermediate holder. In addition, each of the parallelogram legs has slot-shaped incisions.

The slot-shaped incisions in the fastening part of a parallelogram leg have a stress-uncoupling function, preventing the propagation of a force or stress from one or more fastening portions to the rest of the parallelogram leg and to those parts of the force-measuring cell that serve to receive and transmit the force generated by a load acting on the movably guided parallelogram leg. In the case where this kind of force-measuring cell is used in a scale, the connection of a weighing pan or a weighing-pan support to the vertically movable parallelogram leg, or the connection of the force-measuring cell or in particular of the force-transmitting device to a housing and/or to an intermediate holder is often accomplished by means of screws. This leads to stresses which are caused on the one hand by cutting the tapped holes in the material that the parallel-guiding mechanism is made of, and on the other hand by tightening the screws in the threaded holes. Preferably, the propagation of these stresses to the rest of the force-measuring cell is avoided or at least reduced by slot-shaped incisions or other cutouts in the material of the fastening part of the force-transmitting device. As is commonly known, forces and stresses of this kind which come from the mounting attachment can cause errors in the measuring result.

BACKGROUND OF THE ART

The state of the art already includes disclosures of force-transmitting devices with slot-shaped incisions or cutouts in the parts that contain one or more fastening portions.

A force-transmitting device of this kind in a force-measuring cell with a parallelogram-shaped guiding mechanism is described in EP 0 511 521. At opposite ends, i.e., in a vertically guided parallelogram leg and a stationary parallelogram leg, this force-transmitting device is equipped with respective fastening arrangements that serve on the one hand to attach a load carrier and on the other hand to attach the load cell itself to a housing. At least one of the fastening arrangements has a fastening portion and a connecting portion that are uncoupled from each other by a transition portion. The latter is formed in the shape of narrow web that is kept as slender as possible, so that the propagation of forces and stresses caused by the fastening means, e.g., by screws, is kept away from the connecting portion. This concept of uncoupling material portions from each other is expressed in the description of EP 0 511 521 B1 through a variety of configurations of the force-transmitting device, in particular in regard to the connecting portion and the fastening portion. In essence, the transition portion is characterized by differently shaped cutouts in the material, in particular circular bore cuts. It is further proposed to arrange ring-shaped grooves around the individual fastening locations in order to uncouple the fastening locations from the rest of the fastening portion.

The manufacturing process for the embodiments proposed in EP 0 511 521 B1 is relatively expensive, particularly in the case of the ring-shaped grooves surrounding a fastening location.

A weighing cell is disclosed in DE 195 35 202 C1 with a parallel-guiding mechanism consisting of a housing-based fixed part and a load-receiving part which are connected by two parallelogram guides. In a first embodiment, the housing-based fixed part has at least two vertically oriented holes to fasten the weighing cell and is equipped with slot-shaped incisions to uncouple the rest of the housing-based fixed part from the area around the fastening holes which is affected by the screws. The incisions in this case consist of one slot-shaped incision each from the top and from the bottom, where the slot-shaped incision from the bottom is extended by an angled-off horizontal portion in which one of the vertical holes ends.

In the second embodiment, at least two horizontally extending holes are provided for fastening the weighing cell to the housing, with the holes ending in slot-shaped incisions entering from the sides. A third slot-shaped incision which runs likewise in the vertical direction is arranged between the holes that run side by side. This configuration leaves only a vertically extending web in place and thus separates the housing-based fixed part from the area around the fastening holes which is affected by the screws, whereby the part of the weighing cell that performs the measuring function is uncoupled from the fastening part in regard to stresses and forces. Common to both embodiments, the horizontally and the vertically directed slot-shaped incisions traverse, respectively, the entire width or the entire height of the force-transmitting device.

This embodiment has the drawback that the structural strength, specifically of the housing-based fixed part and/or of the load-receiving part, suffers as a result of the slot-shaped incisions that run along the entire height or width of the respective parallelogram leg of the force-transmitting device. In particular, this concept no longer leaves the entire height or width of the respective parallelogram leg available to absorb laterally acting torques.

An objective of the disclosed embodiments is to achieve a good degree of uncoupling of the fastening part in each parallelogram leg of a force-transmitting device and to achieve at the same time a high degree of structural stability of the force-transmitting device while meeting the requirement that the measures taken for the uncoupling can be cost-effectively realized in production.

SUMMARY OF THE INVENTION

In a device for transmitting a force in a force-measuring cell with a parallel-guiding mechanism in which a fixed, stationary parallelogram leg and a movably guided parallelogram leg are connected to each other by parallelogram guides, the stationary parallelogram leg and/or the movably guided parallelogram leg has a part which serves the function of fastening and has at least two fastening portions. Each of the fastening portions has at least one hole running perpendicular to the associated surface of the respective parallelogram leg. The holes serve to attach a load carrier to the force-transmitting device and/or to attach the force-transmitting device to a housing or to an intermediate holder. In addition, each of the parallelogram legs has slot-shaped incisions. The fastening portions have fastening pad areas that are raised relative to the respective parallelogram-leg surface. The part with the fastening function is separated from the rest of the parallelogram leg by first slot-shaped incisions which run partway through the parallelogram leg and whose cutting profile area in the parallelogram leg, as projected into a plane extending through the fastening portion and running perpendicular to the parallelogram plane and in the travel direction of the movably guided parallelogram leg, does not extend farther in this plane than to the opposite side of the fastening portion in relation to the surface of the parallelogram leg.

Thus, the dimensions of a fastening portion are defined substantially by the area of its fastening pad, and in the direction perpendicular to the fastening pad surface by the length of the holes provided for the fastening connection.

Providing at least two fastening portions ensures a structurally sound connection between the force-measuring cell and the housing or an intermediate holder, or between the force-measuring cell and a load-receiving device. On the one hand, this allows designs in which the distance between the fastening portions is maximized and on the other hand, it makes the force-transmitting device relatively insensitive in regard to torsion-generating forces and corner-load effects that occur with an increased number of fastening portions, also including in particular the case of force-measuring cells for higher load capacities. The slot-shaped incisions, whose projected dimensions are limited to the corresponding dimensions of the respective fastening portion, run only through part of the width and height of a force-transmitting device. In the surface area, they may extend beyond the respective dimension of the fastening portion because of factors related to the manufacturing process.

With this concept, a sufficient depth of material is left in place to connect the fastening part to the rest of the respective parallelogram leg, so that on the one hand the stresses are largely uncoupled from the sensitive part of the force-transmitting device, while on the other hand the force-transmitting device still has a sufficient rigidity to absorb laterally directed torques if they occur, as the entire height as well as the entire width of the respective parallelogram leg are available to intercept such torques. Furthermore, the raised pad areas at the fastening portions ensure well defined fastening zones, so that the contact pressure is evenly distributed and symmetric over the fastening pad surface.

In a preferred embodiment, the fastening portions as well as the slot-shaped incisions are, either in their individual shapes or in pairs, mirror-symmetric relative to a parallelogram plane extending as a center plane through the parallelogram mechanism.

In advantageous embodiments, the slot-shaped incisions can extend in a plane that runs either at an oblique angle or parallel or perpendicular to the corresponding fastening pad surface.

In a preferred further development, there can be further slot-shaped incisions, specifically second and/or third slot-shaped incisions. The latter can likewise extend in a plane that runs at an oblique angle to the corresponding fastening pad surface. In a special embodiment, each of the second and/or the third slot-shaped incisions is oriented in a plane that runs perpendicular to the first slot-shaped incisions.

The force-transmitting device can be designed so that the at least two fastening portions are arranged laterally in the area of the respective end surfaces of a substantially block-shaped stationary parallelogram leg and/or of an analogously designed movably guided parallelogram leg. In alternative configurations, the at least two fastening portions are arranged in the area of a topside or a bottom side of a substantially block-shaped stationary parallelogram leg and/or of a movably guided parallelogram leg. In further embodiments the at least two fastening portions are arranged in separate positions at two opposite sides of a substantially block-shaped stationary parallelogram leg and/or of a movably guided parallelogram leg.

The fastening pad surfaces can be of a rectangular shape and/or each fastening pad surface is arranged in point symmetry relative to the center of the fastening hole. In particular, a fastening surface can also be circular. While the fastening pad surfaces in preferred embodiments are plane surfaces, this is not a necessary requirement.

In a particularly preferred embodiment, the force-transmitting device has a parallel-guiding mechanism that is formed of an integral block of material.

In a preferred further development, the entire force-transmitting device is formed of an integral block of material.

BRIEF DESCRIPTION OF THE DRAWINGS

In the following, the disclosed embodiments are further described through examples that are illustrated schematically in the drawings, wherein:

FIG. 2 represents a perspective view of a portion of a force-transmitting device with four laterally arranged fastening portions and first slot-shaped incisions, with parts a) to c) of FIG. 2 showing different variants;

FIG. 3 represents a perspective view of a portion of a force-transmitting device with four laterally arranged fastening portions and first and second slot-shaped incisions, with parts a) and b) of FIG. 3 showing different variants;

FIG. 4 represents a perspective view of a portion of a force-transmitting device with four laterally arranged fastening portions and first, second and third slot-shaped incisions;

DETAILED DESCRIPTION OF A PREFERRED EMBODIMENT

Figure 1:
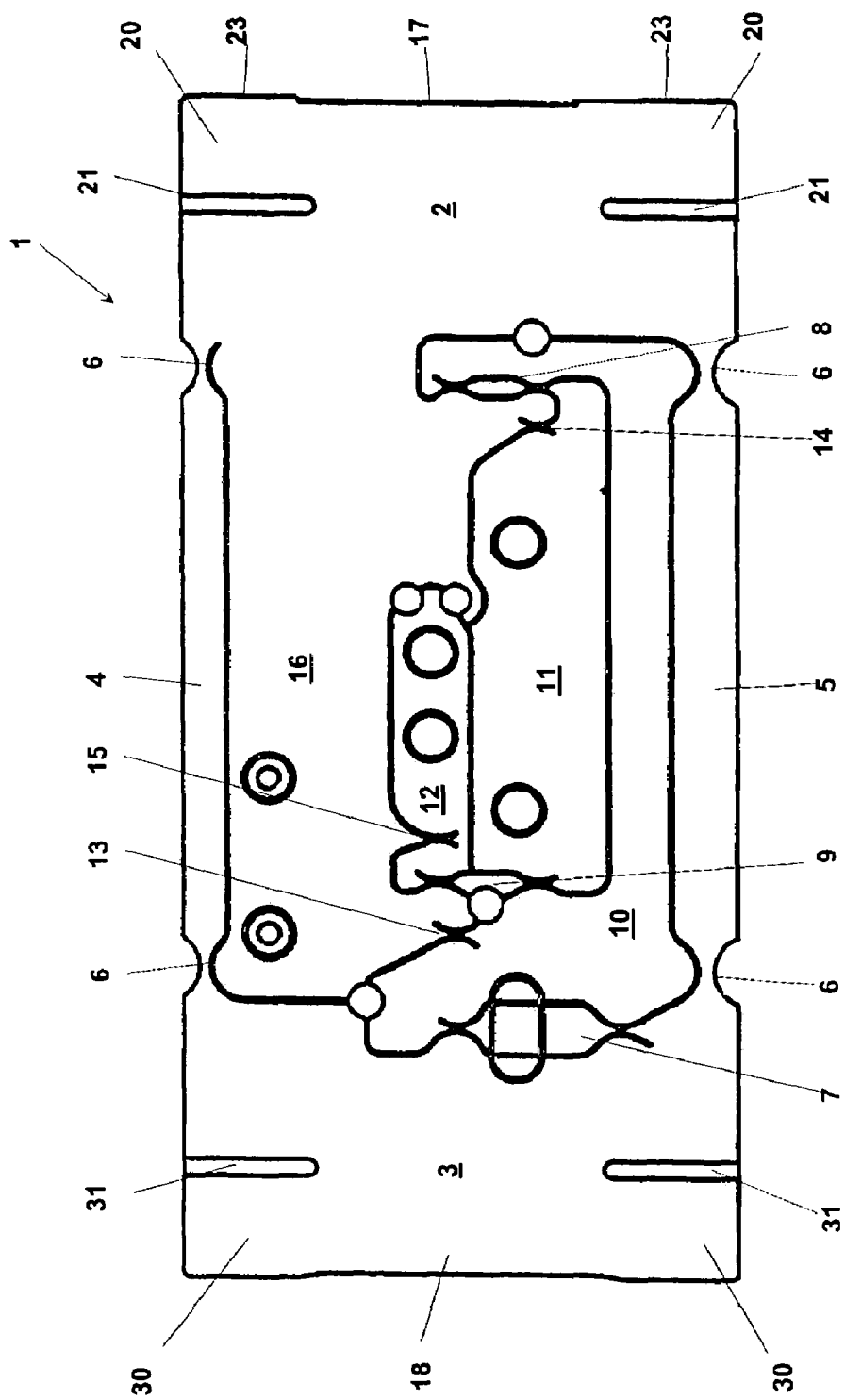
FIG. 1 represents a side view of a force-transmitting device in a force-measuring cell with a force-reducing lever mechanism.
Figure 5:
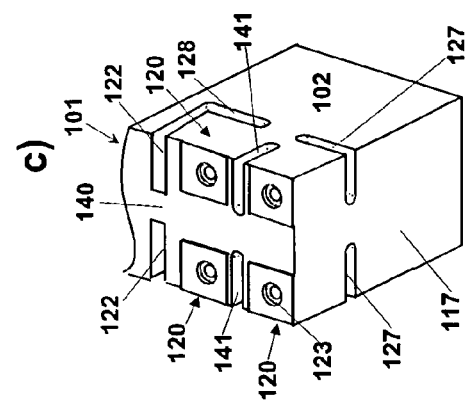
FIG. 5 represents a perspective view of a portion of a force-transmitting device with fastening portions arranged at the top or bottom of a parallelogram leg of the force-transmitting device, with a) first slot-shaped incisions, b) second slot-shaped incisions oriented in a second direction and supplementing the first incisions, and c) first, second and third slot-shaped incisions.
Figure 5:
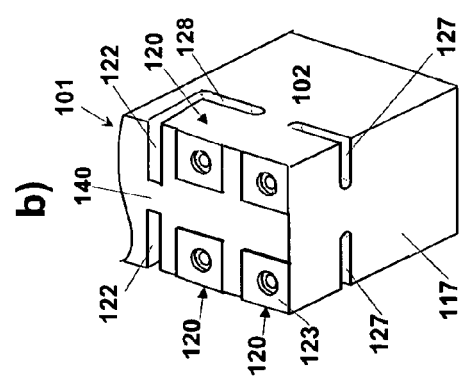
Figure 5:
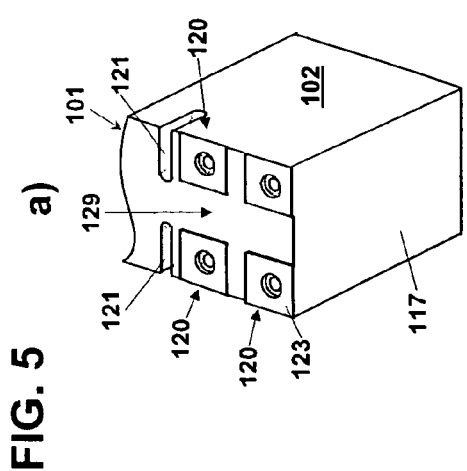

The force-transmitting device 1 shown in a side view in FIG. 1 is of a type that is used in a force-measuring cell, for example for a weighing scale. This force-transmitting device 1 has a parallel-guiding mechanism with upper and lower parallelogram guides 4 and 5, respectively, each of which is pivotally connected by way of flexure pivots 6 to a vertically movable parallelogram leg 3 and a stationary parallelogram leg 2. The force-transmitting device 1 includes a lever mechanism which in the illustrated arrangement consists of three levers 10, 11, 12. The levers 10, 11, 12 are connected to the vertically movable parallelogram leg 3 and to each other through coupling elements 7, 8, 9 and are pivotally supported by way of fulcrum flexures 13, 14, 15 on a cantilevered extension 16 of the stationary parallelogram leg 2.

At the end surface 17 of its stationary parallelogram leg 2, the force-transmitting device 1 has four fastening portions 20 with fastening pad surfaces 23 that are raised slightly in relation to the end surface 17. When the force-transmitting device 1 is fastened, for example to a housing or a fixed, housing-connected intermediate holder (not shown in the drawing), the fastening pad surfaces 23 are resting against the housing or intermediate holder. The attachment to the housing or intermediate holder can be made, e.g., by means of screws that are received in tapped holes provided for this purpose in the fastening portions 20. Four slot-shaped incisions 21 effect an individual partial separation of each of the fastening portions 20 from the rest of the stationary parallelogram leg 2 and thus from the body of the force-transmitting device 1. Only one upper and one lower slot-shaped incision 21 are visible in FIG. 1. The slot-shaped incisions 21 have about the same dimensions as the fastening pad surface areas 23 of the associated fastening portions 20, as illustrated in detail in FIGS. 2 to 9.

On the opposite side from the end surface 17, the end surface 18 of the vertically movable parallelogram leg 3 likewise has four fastening portions 30 for a load carrier or for an appropriate intermediate part (not shown in the drawing). The fastening portions 30 can be of an entirely analogous configuration as the fastening portions 20, and in like manner they are partially separated by upper and lower slot-shaped incisions 31 from the rest of the vertically movable parallelogram leg 3 and thus from the body of the force-transmitting device.

Figure 9:
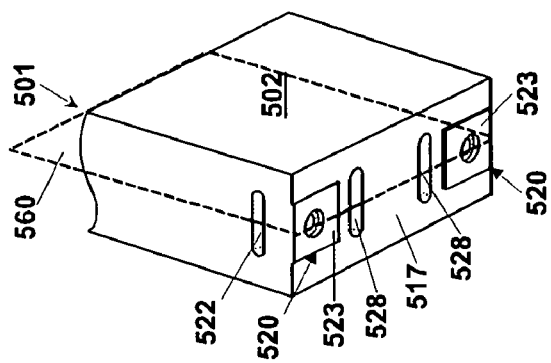
FIG. 9 represents a perspective view of a portion of a force-transmitting device with two laterally arranged fastening portions and first and second slot-shaped incisions.
Figure 8:
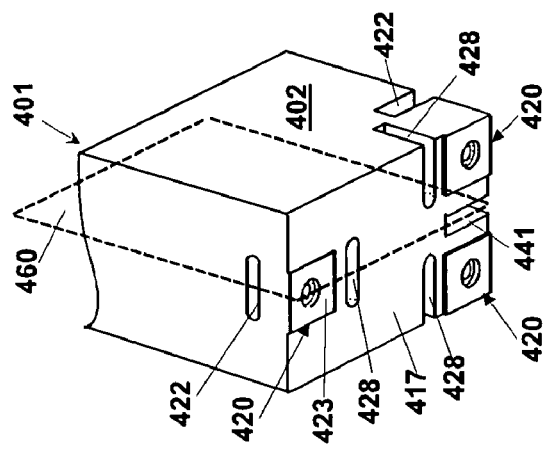
FIG. 8 represents a perspective view of a portion of a force-transmitting device with three laterally arranged fastening portions and first and second slot-shaped incisions, and with a third slot-shaped incision at the underside.
Figure 7:
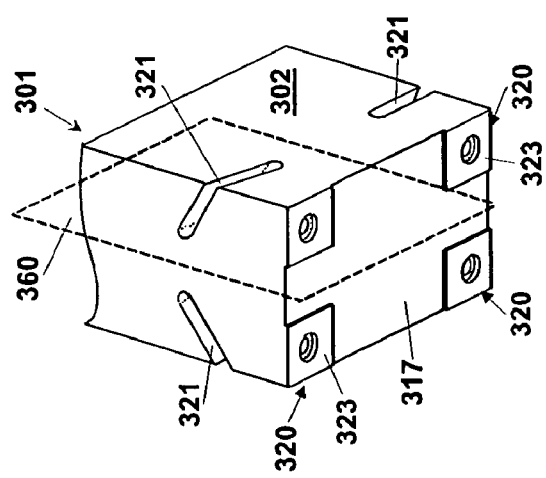
FIG. 7 represents a perspective view of a portion of a force-transmitting device with four laterally arranged fastening portions and first slot-shaped incisions oriented at an oblique angle relative to the fastening pad surfaces.

The parallel-guiding mechanism is configured with mirror-symmetry relative to a center plane of the force-transmitting device that extends parallel to a parallelogram plane (also see FIGS. 7 to 9).

FIG. 2 gives a perspective view of portions of a force-transmitting device 1 in the area of one of the parallelogram legs, for example the stationary leg 2, which is configured in this case to be fastened laterally to a housing or a housing-connected intermediate part (not shown in the drawing). Each of a total of four fastening portions 20 is arranged near a corner of the parallelogram leg 2, with a first slot-shaped incision 21 being provided for each of the fastening portions 20. The slot-shaped incisions 21 are produced by removing material at a distance of a few millimeters from the end surface 17. The slot-shaped incisions 21 are preferably produced by milling, but they can also be made by means of an erosion process. The function of the slot-shaped incisions 21 is to uncouple the fastening portions 20 from the rest of the parallelogram leg 2 and thus from the body of the force-transmitting device 1, so that stresses and forces are not propagated from a fastening portion 20 into the rest of the parallelogram leg.

A vertically movable parallelogram leg 3 can have an entirely analogous configuration in regard to its fastening portions 30 for the attachment of a weighing pan carrier or a suitable intermediate part. The details of the movably guided parallelogram leg will therefore not be explicitly covered in the following paragraphs. However, for all of the configurations of a force-transmitting device described herein—including those following below—the disclosure is applicable likewise to analogous configurations in the area of the vertically movable parallelogram leg.

Each of the four fastening portions 20 has a slightly raised pad 25 which protrudes from the end surface 17 and has a planar fastening pad surface area 23 providing a supporting contact for fastening the force-transmitting device 1 to a housing or an intermediate holder. Approximately centered in the fastening pad surfaces are tapped holes 26 where fastening screws can be inserted. Each tapped hole ends in the respective slot-shaped incision 21. As is self-evident, one could also use other fastening means, for example bolts, for an attachment of the force-transmitting device 1 to a housing or an intermediate holder and/or to fasten a weighing pan to the force-transmitting device.

The parallelogram leg shown in FIG. 2a) has fastening portions 20 with raised pads 25 that have a rectangular or square fastening pad surface area 23 ending flush with the corners of the parallelogram leg 2. The first slot-shaped incisions 21 arranged at each of the fastening portions 20 are in this case produced by disk-shaped milling cutters, as evidenced by the arc-shaped bottom of the slot-shaped incision 21. The slot-shaped incisions 21 run parallel to their associated fastening pad surfaces 23 and extend over a surface area approximately equal to the fastening pad surface 23. The slot-shaped incisions leave a web portion 40 in place between the fastening portions 20 and the rest of the parallelogram leg 2. Being of a relatively narrow width, the web portion 40 will on the one hand not allow the passage of forces and stresses caused by the fastening means, while on the other hand the force-transmitting device remains sufficiently rigid at the fastening portions, because even with the uncoupling by means of slot-shaped incisions 21, the remaining material extends over the entire height as well as the width of the force-transmitting device 1.

FIG. 2b) illustrates the same portion of the parallelogram leg 2 as shown in FIG. 2a), but the first slot-shaped incisions 22 are in this case somewhat wider, and the bottom of the incision is flat. These slot-shaped incisions 22 were produced by shaft-milling.

The raised fastening pads 25 in FIG. 2c) have circular fastening pad surface areas 24. In their fastening function, they have the advantage of a more uniform distribution of the contact force around the fastening hole due to their symmetry relative to the fastening hole. It should be noted in this context that the fastening pad surface areas 23, 24 have to be sufficiently large so that the contact pressure in the connection to a housing or to an intermediate holder does not become excessive and remains in a non-critical range where the material does not reach its yield stress.

In addition to the first slot-shaped incisions 21, 22, it is possible to arrange further slot-shaped incisions around the respective fastening portions 20. In a form of representation that is analogous to FIGS. 2a) and 2b), an embodiment of a force-transmitting device is shown in FIGS. 3a) and 3b) with additional, second slot-shaped incisions 27, 28 arranged at the end surface 17 and oriented perpendicular to the first slot-shaped incisions 21, 22. Like the first slot-shaped incisions 21, 22, the slot-shaped incisions 27, 28 are limited approximately to the size of a fastening portion 20. Their primary function is to uncouple the fastening portions 20 from each other in regard to the propagation of stresses.

In principle, the second slot-shaped incisions could also run across the entire width of the force-transmitting device 1 in the area of the parallelogram leg 2 for an even stronger uncoupling of the fastening portions 20 from each other as well as between the fastening portions at the upper and lower locations of the parallelogram leg.

In a representation that is analogous to FIGS. 2 and 3, the embodiment of a force-transmitting device 1 shown in FIG. 4 has third slot-shaped incisions 41 running perpendicular to the first and second slot-shaped incisions. The third slot-shaped incisions 41 are arranged midway between the two upper fastening portions 20 as well as midway between the two lower fastening portions 20. With this configuration, the fastening portions 20 are nearly isolated fastening cubes or fastening blocks, with only narrow webs of material left in place in all three dimensions between the fastening portions 20 and the rest of the force-transmitting device, which has a particularly beneficial effect on the uncoupling of the forces and torques. In particular, this arrangement also uncouples all of the fastening portions 20 from each other. An embodiment of this kind provides a high degree of uncoupling of the fastening portions 20, but is at the same time more rigid in regard to bending when compared to the known existing solutions.

FIGS. 5a) to 5c) illustrate a portion of a force-transmitting device 101 with a stationary parallelogram leg 102 that can be connected to a housing or an intermediate part through four fastening portions 120 arranged near a top or bottom surface 129 with raised fastening pad areas 123 protruding therefrom. The variation taught here may also be used in association with a movably guided parallelogram leg of the force-transmitting device. In either case, first slot-shaped incisions 121 serve to uncouple the fastening portions 120 that are farther from the end surface 117. The contour area of the incision in this embodiment is about as large as the rectangular fastening pad surfaces 123 of the fastening portions 120. The slot-shaped incisions 121 run parallel to their associated fastening pad surfaces 123 and extend over a surface area approximately equal to the fastening pad surface 123. In a manner analogous to FIG. 2a), the first slot-shaped incisions 121 in FIGS. 5a) through c) leave a web portion 140 in place between the fastening portions 120 and the rest of the parallelogram leg 2. Being of a relatively narrow width, the web portion 140 will, on the one hand, not allow the passage of forces and stresses caused by the fastening means, while, on the other hand, the force-transmitting device 101 remains sufficiently rigid at the fastening portions, because even with the uncoupling by means of first slot-shaped incisions 121, the remaining material extends over the entire height as well as the width of the force-transmitting device 101.

In comparison to FIG. 5a), a further solution which is presented in FIG. 5b) improves the uncoupling of the body of the force-transmitting device 1 from the fastening portions 120, more specifically from the fastening portions 120 that are located farther from the end surface 117, through second slot-shaped incisions 127, 128 in the parallelogram leg 102 which are approximately perpendicular to the first slot-shaped incisions 122 and approximately parallel to the fastening pad surfaces. The slot-shaped incisions 128, which are farther back from the end surface, are shown connected to the first slot-shaped incisions 122, but this is not strictly required. The slot-shaped incisions 128 are produced preferably by shaft-milling from the outer surfaces that extend in the direction of the parallelogram plane. The second slot-shaped incisions 127 that begin at the end surface 117 serve primarily to improve the uncoupling of the fastening portions 120 next to the end surface from the rest of the parallelogram leg 102.

In the foregoing arrangement with the second slot-shaped incisions 127, 128, it is likewise possible to add third slot-shaped incisions 141 and possibly a fourth slot-shaped incision in the parallelogram leg 102, as a preferred solution to uncouple the fastening portions 120 from each other, as shown in FIG. 5c) for an embodiment that has second slot-shaped incisions 127, 128 and wherein third slot-shaped incisions 141 run parallel to the first slot-shaped incisions.

Figure 6:
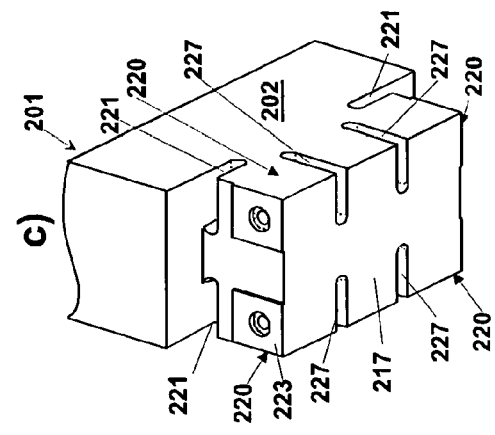
FIG. 6 represents a perspective view of a portion of a force-transmitting device with fastening portions arranged at the top and bottom of the force-transmitting device, with a) first slot-shaped incisions, b) and c) variant versions with first and second slot-shaped incisions.
Figure 6:
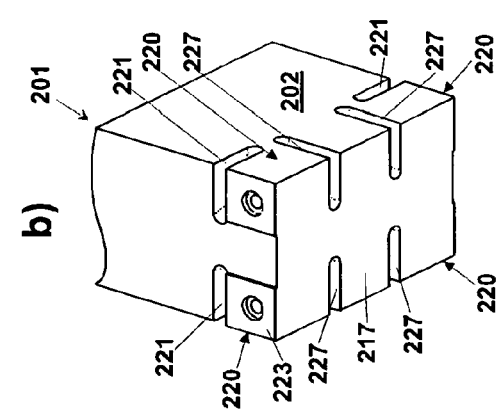
Figure 6:
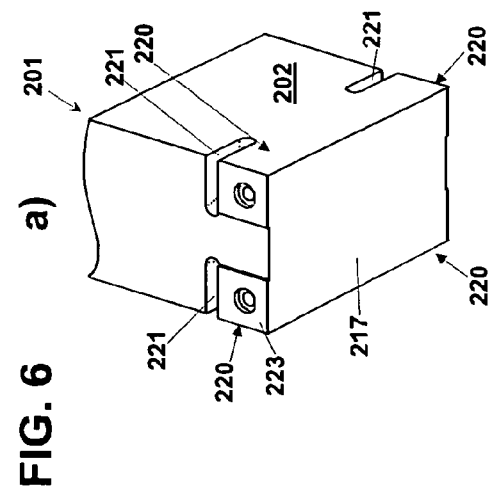

FIG. 6 illustrates three different variants of an embodiment of the force-transmitting device 201 with a total of four fastening portions 220, two of which are arranged at the top and two at the bottom of, for example, the stationary parallelogram leg 202. The first slot-shaped incisions 221 have an analogous configuration as the slot-shaped incisions 121 of the embodiment represented in FIG. 5a), but are in this case arranged at the top as well as at the bottom of the parallelogram leg 202.

In addition to the first slot-shaped incisions 221, the embodiment of FIG. 6b) has second slot-shaped incisions 227 which, like the second slot-shaped incisions 127 shown in FIG. 5b), run parallel to the associated fastening pad surfaces. The second slot-shaped incisions 227 have the function to uncouple on the one hand the fastening portions 220 from the rest of the parallelogram leg and on the other hand to uncouple the upper and lower fastening portions 220 from each other.

The configuration shown in FIG. 6c) is analogous to 6b), except that the height of the body of the force-transmitting device 1 is different from the distance between the upper and lower fastening pad surfaces 223.

In the variants shown in FIGS. 6b) and 6c), the first and second slot-shaped incisions 221 can likewise be supplemented by third slot-shaped incisions which serve to uncouple, respectively, the two upper fastening portions 220 from each other and the two lower fastening portions 220 from each other.

In this context, it should be noted that the four fastening portions could also be split up into two fastening portions on one of the outside surfaces and two fastening portions on the other of the outside surfaces of the parallelogram leg that are parallel to the parallelogram plane, in which case the arrangement of the first slot-shaped incisions 221 would be analogous to the first slot-shaped incisions 221 of FIG. 6a).

As FIG. 7 shows, the slot-shaped incisions do not necessarily have to be parallel to the fastening pad surfaces. It is also conceivable to use first slot-shaped incisions 321 that run at an oblique angle relative to the fastening pad surfaces, and the same applies also in particular to second and third slot-shaped incisions, which are not shown in FIG. 7. It needs to be noted, however, that the obliquely oriented slot-shaped incisions are arranged in substantially mirror-symmetric pairs relative to a parallelogram plane which in this case extends through the parallel-guiding mechanism as a symmetry plane 360, indicated in FIG. 7 by broken lines. Without imposing this design constraint, one would incur an increased risk that the force transmitted by the force-transmitting device could also include force components that deviate from the desired direction of the deflection of the movably guided parallelogram leg, i.e., from the direction of the gravity force if the force-transmitting device is used in a weighing scale. It should further be mentioned that the projection of the oblique slot-shaped incisions 321 into the plane of the fastening pad surfaces 323 covers an area approximately equal to the size of the fastening pad surfaces 323.

FIG. 8 gives a perspective view of an embodiment of a force-transmitting device 401 with three laterally arranged fastening portions 420, with two of the three fastening portions 420 being arranged at the bottom and one being arranged at the top of the parallelogram leg 402. The reverse arrangement, i.e., two fastening portions 420 at the top and one at the bottom, is likewise conceivable. The fastening portions 420 at the bottom are uncoupled from the rest of the parallelogram leg 402 by first slot-shaped incisions 422, second slot-shaped incisions 428, and a third slot-shaped incision 441, while the fastening portion 420 in the centered position at the top is separated from the rest of the parallelogram leg 402 by a first slot-shaped incision 422 and a second slot-shaped incision 428. All of the slot-shaped incisions of the embodiment of FIG. 8 are produced by shaft-milling. The fastening portions 420 as well as the slot-shaped incisions 422, 427, 441 are mirror-symmetric relative to the symmetry plane 460 of the force-transmitting device 402.

FIG. 9 represents a perspective view of part of a force-transmitting device 501 with two fastening portions 520 arranged above one another at the end surface 517, where each of the fastening portions has a first slot-shaped incision 522 and a second slot-shaped incision 528. The fastening portions 520 as well as the slot-shaped incisions 522, 528 are arranged with mirror-symmetry relative to the symmetry plane 560 of the force-transmitting device 502.

The force-transmitting device has been described and illustrated herein in a variety of preferred embodiments. However, the concepts taught herein will enable further embodiments to be realized by individuals who are skilled in the art. Specifically, the measures to achieve an uncoupling through slot-shaped incisions are equally applicable to force-transmitting devices in force-measuring cells that operate according to the principle of electromagnetic force compensation, or in force-measuring cells where a deformation is detected by means of strain gauges, as well as in other force-measuring cells that are not specifically named herein.

What is claimed is:

1. A force-transmitting device in a force-measuring cell, comprising:
   a parallel-guiding mechanism, comprising a movably-guided parallelogram leg and a stationary parallelogram leg with top and bottom faces, an end face and a pair of opposing side faces, the respective parallelogram legs being connected to each other by parallelogram guides;
   at least one of the parallelogram legs further comprising a fastening part with at least two fastening portions arranged on at least one of the top and bottom faces thereof, each fastening portion comprising a fastening pad surface with a fastener-receiving hole tapped therein; and
   a first slot-shaped incision associated with each fastening portion, each first slot-shaped incision penetrating in a straight line only partially through one of the side faces and the face on which the fastening portion is arranged, each fastening portion being located between the end face and the associated first slot-shaped incision.

2. The force-transmitting device of claim 1, wherein:
   each fastening pad surface is raised relative to the face on which it is arranged.

3. The force-transmitting device of claim 1, wherein:
   the fastening portions and the first slot-shaped incisions are mirror-symmetric relative to a plane that is orthogonal to and bisects the end face of the stationary parallelogram leg.

4. The force-transmitting device of claim 3, wherein:
   the fastening portions and the first slot-shaped incisions are arranged in pairs.

5. The force-transmitting device according to claim 1, wherein:
   the fastening pad surfaces are configured in a rectangular shape.

6. The force-transmitting device according to claim 1, wherein:
   each fastening pad surface is configured with point symmetry relative to a center of the hole.

7. The force-transmitting device of claim 1, further comprising:
   a second slot-shaped incision associated with each fastening pad surface, each second slot-shaped incision extending in an incision plane parallel to the associated fastening pad surface.

8. The force-transmitting device of claim 7, wherein:
   each fastening pad surface is raised relative to the face on which it is arranged.

9. The force-transmitting device of claim 7, wherein:
   the fastening portions and the first slot-shaped incisions are mirror-symmetric relative to a plane that is orthogonal to and bisects the end face of the stationary parallelogram leg.

10. The force-transmitting device of claim 7, wherein:
    the fastening portions and the first slot-shaped incisions are arranged in pairs.

11. The force-transmitting device of claim 7, further comprising:
    a third slot-shaped incision associated with each fastening portion, each third slot-shaped incision extending between a pair of fastening pads, parallel to one of the first slot-shaped incisions.

12. The force-transmitting device according to claim 7, wherein:
    the fastening pad surfaces are configured in a rectangular shape.

13. The force-transmitting device according to claim 7, wherein:
    each fastening pad surface is configured with point symmetry relative to a center of the hole.

14. The force-transmitting device according to claim 1, wherein:
    the parallel-guiding mechanism is formed of an integral block of material.

15. The force-transmitting device according to claim 1, wherein:
    the force-transmitting device is formed of an integral block of material.

16. The force transmitting device of claim 1, wherein:
    the first slot-shaped incisions leave a web portion between the fastening portions and a remainder of the parallelogram leg, so that at least a portion of each of the orthogonal dimensions of the parallelogram leg is intact.

17. The force-transmitting device of claim 7, wherein:
    the fastening part has a height between the fastening portions arranged on each of the top and bottom faces thereof, the fastening part height being different than a height between the top and bottom faces of the force-transmitting device.

* * * * *